3,737,462
METHOD FOR THE PREPARATION OF 1,2-DIAMINOPROPANE

Zafarullah K. Cheema, Morristown, Robert L. Formaini, Millington, and Harry E. Ulmer, Morristown, N.J., assignors to Allied Chemical Corporation, New York, N.Y.
No Drawing. Filed Aug. 4, 1971, Ser. No. 172,349
Int. Cl. C07c 85/10
U.S. Cl. 260—583 P                  11 Claims

ABSTRACT OF THE DISCLOSURE 1,2-diaminopropane can be prepared from 1,2-methylglyoxime in good yield by hydrogenation in the presence of a hydrogenation catalyst in anhydrous alcoholic medium at low temperatures under strongly basic conditions.

---

This invention relates to an improved process for preparing 1,2-diaminopropane. More particularly, this invention relates to a process for preparing 1,2-diaminopropane by hydrogenation of 1,2-methylglyoxime.

DESCRIPTION OF THE PRIOR ART 1,2-diaminopropane can be prepared by ammonolysis of 1,2-dibromopropane. However this process is expensive due to the high cost of the starting material.

The formation of amines from oximes by hydrogenation in the presence of a hydrogenation catalyst is also known. When the hydrogenation is carried out in the presence of ammonia, good yields of primary amines can be obtained. However, $\alpha,\beta$-diamines cannot usually be prepared by this route from the corresponding $\alpha,\beta$-glyoximes, due to side reactions which lead to the formation of aminoketones which condense with loss of water to give dihydropyrazines or aminocarbinols. An attempt to form 1,2-diaminopropane from 1,2-methylglyoxime by hydrogenation of the latter with a Raney nickel catalyst at atmospheric pressure and room temperature in the presence of an alcoholic solvent was unsuccessful as reported by S. Samme, Ann. Chim. Paris 13, 2 656 (1957).

SUMMARY OF THE INVENTION

It is an object of the present invention to provide a method for preparing 1,2-diaminopropane by hydrogenation of 1,2-methylglyoxime in good yield.

Further objects will become apparent from the following detailed description thereof.

We have discovered that 1,2-diaminopropane can be prepared from 1,2-methylglyoxime rapidly and in good yield by hydrogenation in the presence of a catalyst in an anhydrous alcoholic medium at low temperatures under strongly basic conditions.

DETAILED DESCRIPTION OF THE INVENTION

According to the process of the present invention, 1,2-methylglyoxime is hydrogenated in the presence of a hydrogenation catalyst under anhydrous strongly basic conditions at low temperatures to give high yields of 1,2-diaminopropane.

The temperature of the reaction should be maintained below 60° C., preferably between 10 to 40° C. Lower temperatures can be employed so long as the reactants and the products remain in the liquid phase. Since the reaction is exothermic, external cooling means may be required during reaction.

The reaction mixture should be kept strongly basic. An alkali metal hydroxide, i.e., sodium, potassium or lithium hydroxide, is added to the reactants prior to hydrogenation. When added in solid form, the alkali metal hydroxide also acts to absorb any moisture formed during hydrogenation. Sufficient base should be added to maintain strongly alkaline conditions throughout the hydrogenation.

Hydrogenation pressure is not critical and generally pressures of from about zero to 1000 p.s.i. may be employed. In order to promote a good rate of reaction, pressures of from about 200 to 700 p.s.i. are preferred.

Hydrogenation is carried out in the presence of conventional hydrogenation catalysts, such as Raney nickel, Raney cobalt, nickel, or a metal of the platinum series. The concentration of the catalyst should be maintained at a high level, at least about 40, preferably about 100% by weight of the 1,2-methylglyoxime starting material, in order to maintain a high reaction rate. A high reaction rate is desirable to minimize side reactions and consequent formation of undesirable by-products. The solid catalyst can be removed from the reaction mixture in conventional manner, as by filtration, and recycled to a succeeding batch of 1,2-methylglyoxime.

The hydrogenation is generally carried out in the presence of an anhydrous solvent medium. Suitable solvents include the lower aliphatic alcohols, for example, lower alkanols, such as methanol or ethanol. Preferably the concentration of the 1,2-methylglyoxime starting material will be from about 3 to 20% by weight of the alcohol.

When carried out under preferred conditions, the formation of 1,2-diaminopropane is complete in about 1 hour or less, with a minimum formation of undesirable by-products.

When reaction is complete, the catalyst is removed, as by filtration. The product mixture can be fractionally distilled to remove the solvent and any unreacted starting material or by-products. Alternatively, the 1,2-diaminopropane can be precipitated as a salt, such as the hydrochloride salt, by treating the reaction mixture with anhydrous hydrogen chloride. The salt can then be isolated by filtering, washing with excess alcohol, and drying.

The invention will be further illustrated by the following examples, but it is to be understood that the invention is not meant to be limited to the details described therein. In the examples all percentages are by weight.

Example 1

A solution of 1,2-methylglyoxime (10.2 grams, 0.1 mol) in 300 ml. of absolute ethanol was charged to an autoclave and 5 grams of Raney nickel and 2 grams of sodium hydroxide pellets added. The mixture was hydrogenated at room temperature and 650 p.s.i. Hydrogen uptake was complete after 90 minutes. The reaction mixture was filtered to remove the catalyst, and treated with anhydrous hydrogen chloride.

1,2-diaminopropane dihydrochloride precipitated, was filtered, washed with ethanol and dried. Eight grams (72% yield) were obtained as slightly yellowish crystals having a melting point of 218–220° C.

Elemental analysis for $C_3H_{11}N_2Cl$.—Theoretical (percent): C, 19.0; H, 6.1; N, 14.7; Cl, 48. Found (percent): C, 19.1; H, 6.1; N, 13.4; Cl, 50.

The structure was also confirmed by infrared (hereinafter IR) and nuclear magnetic resonance (hereinafter NMR) analyses.

Example 2

The procedure of Example 1 was followed except employing 150 ml. of ethanol, 10.0 grams of Raney nickel and 0.1 gram platinum oxide as catalyst and hydrogenating at 700 p.s.i. Hydrogenation was complete in 70 minutes.

8.2 grams of 1,2-diaminopropane dihydrochloride were obtained having a melting point of 220–222° C. The structure was confirmed by IR.

Example 3

The procedure of Example 1 was followed using 1.5 grams of sodium hydroxide and 10.0 grams of Raney nickel at a hydrogenation pressure of 700 p.s.i. Reaction was complete in 40 minutes.

11.0 grams of 1,2-diaminopropane dihydrochloride (75% yield) were obtained.

Example 4

The procedure of Example 2 was followed except at a hydrogenation pressure of 200 p.s.i.

Reaction was complete in 40 minutes. 1,2-diaminopropane dihydrochloride having a melting point of 219–220° C. was obtained in 60% yield.

Example 5

The procedure of Example 3 was followed except using denatured absolute ethanol.

Reaction was complete in 45 minutes. 10.55 grams of 1,2-diaminopropane dihydrochloride (77% yield) were obtained having a melting point of 220–222° C.

Example 6

The procedure of Example 1 was followed except using 1.2 grams of sodium hydroxide, denatured ethanol, 10.0 grams of Raney nickel and hydrogenation pressure of 30 p.s.i.

Reaction was complete after 140 minutes after 95% of the theoretical amount of hydrogen had been absorbed.

6.97 grams of 1,2-diaminopropane dihydrochloride (65% yield) were obtained having a melting point of 220° C.

Example 7

10.2 grams of 1,2-methylglyoxime, 3.0 grams of anhydrous magnesium sulfate, 3.0 grams of Raney nickel and 14.0 grams of liquid ammonia dissolved in 200 ml. of anhydrous ethanol were charged to an autoclave and hydrogenated at 250 p.s.i. and 100° C. After 20 hours, 70% of the theoretical amount of hydrogen had been absorbed.

The reaction mixture was filtered to remove the catalyst and the ethanol distilled off.

The product contained a mixture of 2,5-dimethylpyrazine, 2,5-dimethylpiperazine and only 2.15 grams of the desired 1,2- diaminopropane, as determined by vapor phase chromatographic, IR and NMR analyses.

We claim:

1. A method for preparing 1,2-diaminopropane, as product, in liquid phase which comprises hydrogenating 1,2-methylglyoxime in the presence of a hydrogenation catalyst present in a concentration of at least about 40%, by weight, based on the weight of 1,2-methylglyoxime, under anhydrous conditions and in the presence of a sufficient quantity of a strong base to maintain strongly alkaline conditions throughout the hydrogenation at a temperature below about 60° C. and recovering the product.

2. A method according to claim 1 wherein the catalyst is Raney nickel.

3. A method according to claim 1 wherein the reaction is carried out in the presence of a solvent.

4. A method according to claim 3 wherein the solvent is a lower alkanol alcohol.

5. A method according to claim 3 wherein the 1,2-methylglyoxime is present in amount of between 3 and 20% by weight of the solvent.

6. A method according to claim 1 wherein the base is sodium hydroxide.

7. A method according to claim 1 wherein the hydrogenation pressure is from about zero to 1000 p.s.i.

8. A method according to claim 1 wherein the product is recovered by filtering the catalyst, and forming the 1,2-methylglyoxime dihydrochloride salt by treating with anhydrous hydrogen chloride.

9. A method according to claim 1 wherein the temperature is maintained at 10 to 40° C.

10. A method for preparing 1,2-diaminopropane, as product, in liquid phase which comprises hydrogenating 1,2-methylglyoxime in the presence of from 40 to 100%, by weight, based on the weight of 1,2-methylglyoxime, of a hydrogenation catalyst in a lower alkanol medium and in the presence of a sufficient quantity of an alkali metal hydroxide to maintain strongly alkaline conditions throughout the hydrogenation at a temperature from about 10 to 40° C. and recovering the product.

11. A method according to claim 10 wherein the hydrogenation pressure is maintained between about 200 and 700 p.s.i. and the alkali metal hydroxide is sodium hydroxide.

References Cited

Degering: "An Outline of Organic Nitrogen Compounds," 1945, p. 192; University Lithoprinters, Ypsilanti, Mich.

Ginsburg: "Concerning Amines," 1967, p. 42; Pergamon Press, New York

Smith: "Open-Chain Nitrogen Compounds," vol. 1, 1965, p. 66, Benjamin, Inc., New York.

JOSEPH P. BRUST, Primary Examiner